Patented Nov. 17, 1953

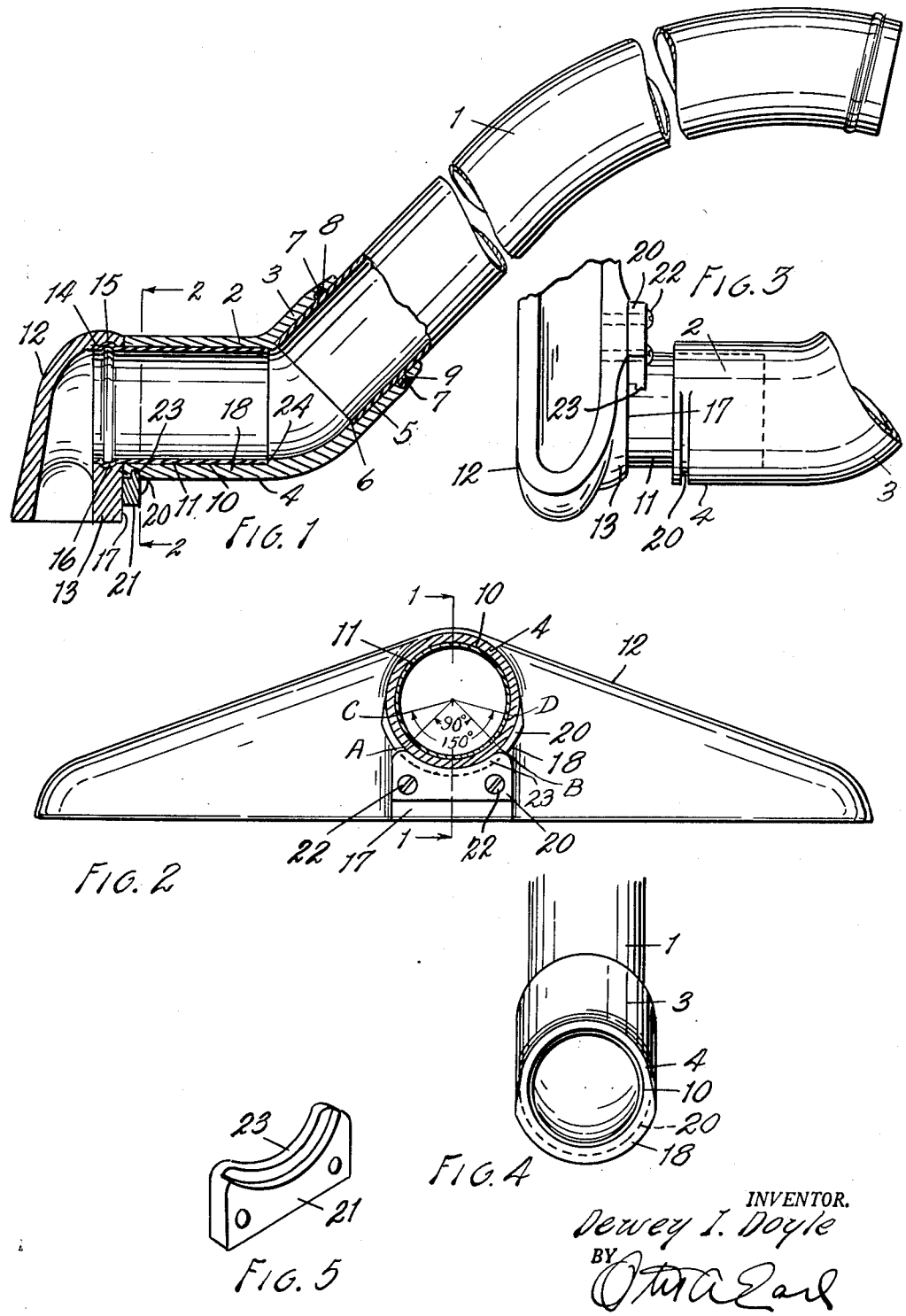

2,659,616

UNITED STATES PATENT OFFICE 2,659,616

VACUUM CLEANER IMPLEMENT AND HANDLE COUPLING

Dewey I. Doyle, Sr., Grand Rapids, Mich., assignor to Doyle Vacuum Cleaner Co., Grand Rapids, Mich.

Application August 30, 1948, Serial No. 46,820

2 Claims. (Cl. 285—97.1)

This invention relates to improvements in vacuum cleaner implement and handle coupling.

The main objects of this invention are:

First, to provide a mounting or coupling for vacuum cleaner heads or implements to a handle which enables very rapid and easy attachment and detachment of the head or implement to the handle.

Second, to provide a structure having these advantages which is capable of withstanding severe usage such, for example, as vacuum cleaner apparatus used in factories is likely to receive.

Third, to provide a structure having these advantages in which parts likely to be broken may be easily and economically replaced thereby avoiding the necessity of providing an entirely new head or implement.

Fourth, to provide a coupling between the handle of a vacuum cleaner and the implement attached thereto, whereby the handle may be rotated through an arc of at least 180° while the implement rests flat on a floor without becoming detached therefrom, and yet which will permit quick and easy detachment of the implement from the handle when it is rotated in either direction to a point within the 180° arc opposite the arc first above mentioned.

Further objects and advantages pertaining to the details and economies of the invention will appear from the description to follow. The invention is defined and pointed out in the claims.

A preferred embodiment of the invention is illustrated in the accompanying drawing, in which:

Fig. 1 is a fragmentary view of a structure embodying my invention partially in section on line 1—1 of Fig. 2.

Fig. 2 is a transverse section on line 2—2 of Fig. 1.

Fig. 3 is a fragmentary view illustrating one step in the assembling or disassembling of the suction head or implement with the handle.

Fig. 4 is a fragmentary outer end elevational view of the handle with the adapter thereon.

Fig. 5 is an inside perspective view of the coupling lug.

Referring to the drawing, the tubular handle 1 is formed of a piece of tubing bent at its inner end for convenience in grasping and manipulation of the instrument. The handle is adapted as a conduit. At the outer end of this handle 1 provide an adapter designated generally by the numeral 2 which is desirably formed as a casting. The handle is desirably formed of a length of drawn tubing. The adapter is provided with a handle socket portion 3 disposed angularly relative to the coupling socket 4. The handle socket portion 3 is provided with an internal cylindrical socket 5 shouldered at its inner end at 6, the handle fits within this socket and is retained therein by the solder 7 within the internal groove 8. The solder is introduced through the hole 9 opening to the groove. The coupling socket member 4 has an internal cylindrical socket 10 receiving the tubular nipple 11 of the implement or suction head 12.

The rear wall 13 of the head or implement 12 is provided with a centrally located hole 14 having an internal groove 15 into which the bead 16 of the nipple 10 is expanded or as an alternative construction, the nipple, formed of a length of tubing, may be cast into the head. The rear wall of the head is provided with a flat surface 17 surrounding the nipple and with which the outer end of the adapter abuts.

The lower portion 18 of the wall of the adapter is radially enlarged so that for a considerable distance around the circumference the outer surface is eccentric with respect to the upper wall portion as is clearly shown in Fig. 4 of the drawing. This enlarged wall portion has a peripheral groove 20 therein extending throughout the enlarged wall portion so that the ends of the groove open at the sides of the adapter as is clearly shown in Fig. 2. The attaching lug 21 is formed independently of the head and desirably may be of steel or brass whereas the head may be of an alloy suitable for die-casting or of aluminum or the like to secure lightness. The lug 21 is detachably secured to the rear wall of the head by means of screws 22 and is of segmental shape having an arcuate rib 23 projecting on its outer side for engagement with the groove 20 in the adapter.

The sheet metal nipple is rotatable within the adapter and is telescopingly engaged therewith. This nipple is desirably formed of drawn tubing so that it presents a smooth exterior to the adapter socket and may be light and relatively thin, so as to reduce weight and also provide a minimum of obstruction within the adapter passage. The inner end of the nipple socket is shouldered at 24 and it will be noted that the shoulders 6 and 24 are the same thickness as the walls of the handle and the nipple so that there is, in effect, a continuous smooth passage through the adapter of uniform diameter and there are no obstructions to hold material which might result in clogging.

This coupling for the head or implement to the handle permits substantial relative rotative movement of the head and handle without disengagement. In the embodiment illustrated, the radially enlarged portion extends through an angle of approximately 150° and the segmental lug is of such dimensions that this relatively rotative movement may be through an angle of at least 180° without disengagement.

For example, in the embodiment shown in Fig. 2 the rib 22 extends throughout an arc of approximately 90°. The groove 20 which receives the rib 22 extends throughout an arc of perhaps 150° or less. Points A and B represent the ends of rib 22 and points C and D represent the open ends of groove 20. This relative rotation between the implement and handle without disengagement of the rib and groove would be from the point where B and C coincide to the point where A and D coincide or 90° plus 150° which is substantially 240°. This leaves an arc of about 120° within which the members may be disengaged. Since, however, the rib 22 occupies about 90° or less of this arc, there would actually be free relative axial movement of the handle and implement throughout an arc of only about 30°.

Thus, the advantage of laying the implement on a floor and being able to rotate the handle from a floor level on one side to the floor level on the opposite side through an arc of 180° is thereby accomplished. The degrees of arc of the rib 22 and groove 20 are not critical, however, but are merely relative. The arc of the rib 22 and thus the size of the attaching lug 21 may be made less than that shown, provided a sufficient bearing surface is present to form a good joint. When the arc of the rib 22 is decreased, the arc of the groove 20 may be increased, and vice versa, so long as the relative movement of at least 180° between handle and implement without disengagement is maintained.

The structure embodying my invention is well adapted for use where the implements are subjected to severe usage and various attachments or heads are commonly required or desirable, for example, in factories where implements adapted for cleaning floors and other implements for cleaning machines are desirable.

I have illustrated and described my invention in an embodiment which is highly practical. I have not attempted to illustrate or describe other embodiments or adaptations as it is believed that this disclosure is sufficient for those skilled in the art to embody or adapt my invention as may be desired.

Having thus described my invention, what I claim as new and desire to secure by Letters Patent is:

1. A joint for connecting a tubular coupling adapted as a conduit to the side of a chambered body having a flat rear wall substantially larger than said coupling with an opening in said rear wall comprising, a tubular cylindrical sheet metal nipple fixedly secured in said opening and projecting normally from said rear wall said wall projecting in a plane a substantial distance around said nipple, said coupling telescopingly and rotatably receiving said nipple, the lower portion of the wall of the coupling being radially thickened through an angle approximating 150°, such thickened wall portion having an exterior peripheral groove adjacent its outer end with the ends of the groove opening at the side edges of the said thickened wall portion, and a separate flat lug having an upwardly concave upper edge mounted against said flat rear wall of said body and having a rabbeted upper edge forming an arcuate flange positioned below and in spaced relation to said nipple and said rear wall and engageable and disengageable with said groove of said coupling by a relative rotative movement of the body and the coupling, the end of the coupling being in abutting engagement with the rear wall of the body when the lug is engaged with the coupling said nipple projecting into said coupling a distance at least equal to the diameter of the nipple, the groove being of such length as to permit relative rotation of said coupling and body through an angle of at least 180° without disengagement of the body from the coupling.

2. A joint for connecting a tubular coupling adapted as a conduit to a chambered body having a flat area at the rear thereof and an opening in said flat area, said flat area extending away from the opening around a portion thereof to provide a mounting area, said joint comprising a cylindrical nipple extending outwardly from said flat area and fixed in said opening, said coupling telescopingly and rotatably receiving said nipple, the lower portion of said coupling being radially enlarged throughout a predetermined arc, an exterior peripheral groove extending throughout the enlarged portion of said coupling and adjacent the outer end thereof with the ends of the groove opening at the side edges of said enlarged portion, a separate lug secured to said mounting area, and an upwardly concave arcuate rib on said lug spaced from said flat area and engageable and disengageable with said groove by a relative rotative movement of the body and the coupling, the total lengths of said groove and said arcuate rib being at least 180° so as to permit a relative rotation between the coupling and body of approximately 180° without disengagement.

DEWEY I. DOYLE, Sr.

References Cited in the file of this patent
UNITED STATES PATENTS

| Number | Name | Date |
|---|---|---|
| 331,170 | Thompson | Nov. 24, 1885 |
| 535,880 | Anderson | Mar. 19, 1895 |
| 1,054,261 | Wetzel | Feb. 25, 1913 |
| 1,115,989 | Thurman | Nov. 3, 1914 |
| 1,162,195 | Spencer | Nov. 30, 1915 |
| 1,193,162 | Lewis | Aug. 1, 1916 |
| 1,474,586 | Hanrahan | Nov. 20, 1923 |
| 2,318,317 | Lofgren | May 4, 1943 |
| 2,322,168 | Smith | June 15, 1943 |
| 2,326,439 | Clements | Aug. 10, 1943 |

FOREIGN PATENTS

| Number | Country | Date |
|---|---|---|
| 761,914 | France | Mar. 30, 1934 |